(No Model.) 2 Sheets—Sheet 1.

G. EASTMAN & P. H. YAWMAN.
ROLLER HOLDER FOR PHOTOGRAPHIC FILMS.

No. 432,990. Patented July 29, 1890.

Witnesses
E. D. Smith
G. W. Vierbuchen

Inventor
George Eastman and Philip H. Yawman
By their Attorneys
Church & Church

THE NORRIS PETERS CO., PHOTO-LITHO., WASHINGTON, D. C.

(No Model.) 2 Sheets—Sheet 2.

G. EASTMAN & P. H. YAWMAN.
ROLLER HOLDER FOR PHOTOGRAPHIC FILMS.

No. 432,990. Patented July 29, 1890.

Witnesses
E. D. Smith
G. W. Verbuckee

Inventor
George Eastman and Philip H. Yawman
By their Attorneys

UNITED STATES PATENT OFFICE.

GEORGE EASTMAN AND PHILIP H. YAWMAN, OF ROCHESTER, NEW YORK, ASSIGNORS TO THE EASTMAN DRY PLATE AND FILM COMPANY, OF SAME PLACE.

ROLLER-HOLDER FOR PHOTOGRAPHIC FILMS.

SPECIFICATION forming part of Letters Patent No. 432,990, dated July 29, 1890.

Application filed July 8, 1889. Serial No. 316,890. (No model.)

*To all whom it may concern:*

Be it known that we, GEORGE EASTMAN and PHILIP H. YAWMAN, of the city of Rochester, county of Monroe, and State of New York, have invented certain new and useful Improvements in Roller-Holders for Photographic Films; and we do hereby declare the following to be a full, clear, and exact description of the same, reference being had to the accompanying drawings, forming a part of this specification, and to figures and letters of reference marked thereon.

Our present invention relates to roller-holders for photographic films, and has for its object particularly to improve the construction and operation of the devices for indicating the winding forward of an exposure of film and marking the same at the point where it is to be severed into separate exposures.

To this end the invention consists in certain novelties of construction and combinations of parts, all as will be hereinafter fully described, and the novel features pointed out particularly in the claims at the end of this specification.

Figure 1:
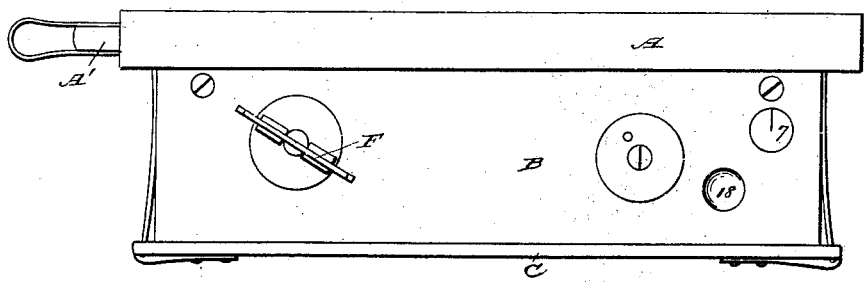
Figure 2:
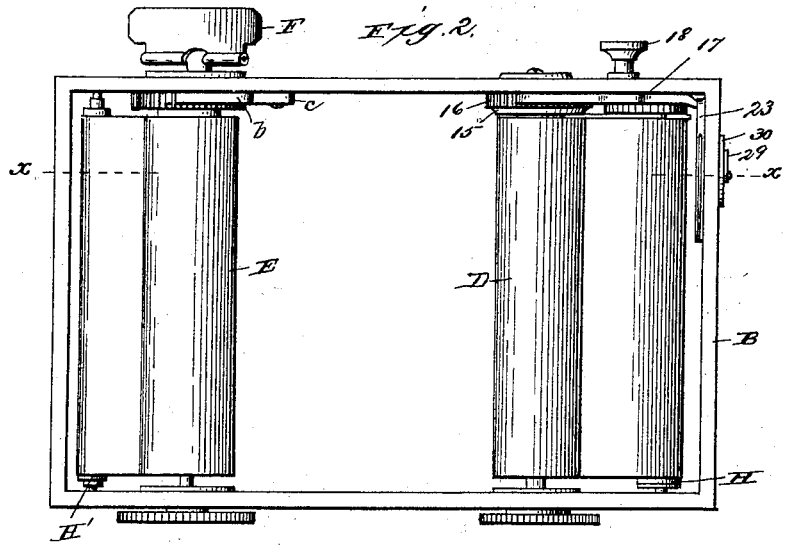
Figure 3:
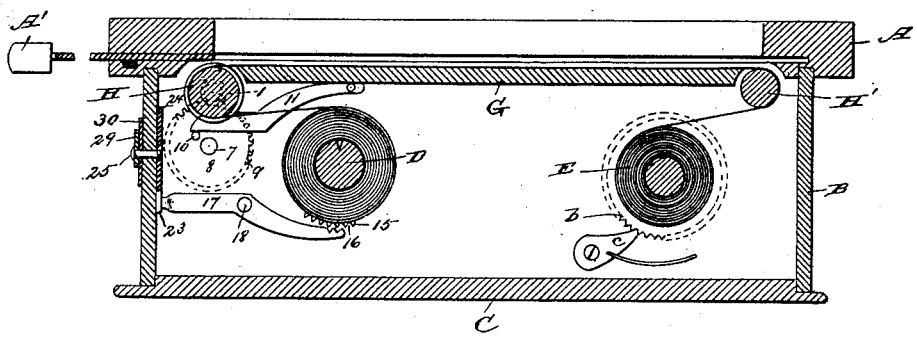
Figure 4:
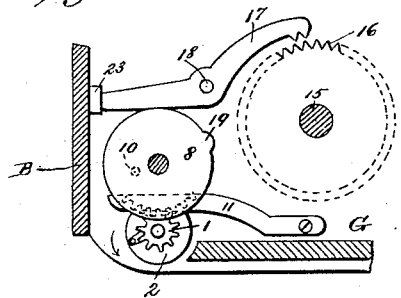
Figure 5:
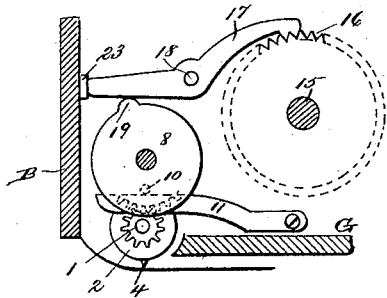
Figure 6:
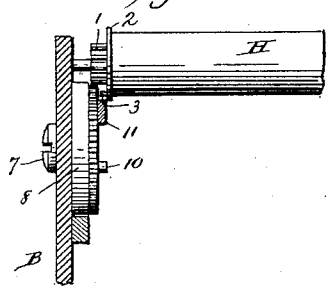
Figure 7:
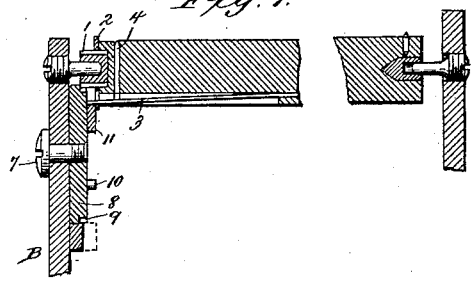
Figure 8:
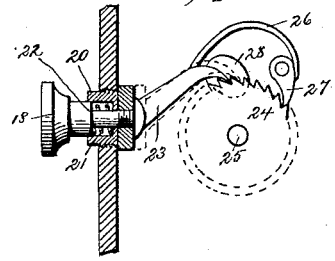
Figure 9:
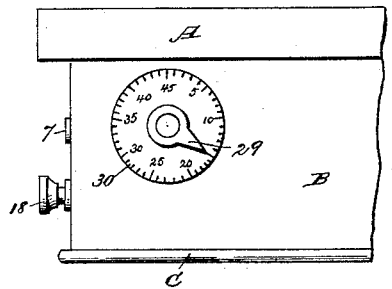
Figures 10, 11:
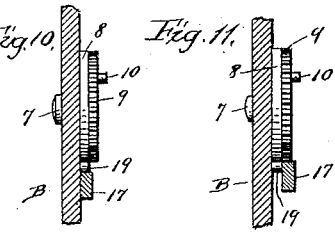

In the accompanying drawings, Figure 1 is a side view of a roller-holder constructed in accordance with our invention; Fig. 2, a view with the back of the holder removed; Fig. 3, a sectional view of the line $xx$ of Fig. 2; Fig. 4, a view of the locking and marking devices, looking from the side of the casing; Fig. 5, a similar view showing the spool locked; Fig. 6, a side view of the measuring-roller, showing the mechanism for operating the film-marker; Fig. 7, a sectional view of the measuring-roller and marker-operating device; Fig. 8, a sectional view of the counter-operating device; Fig. 9, a view of a portion of the end of the holder, showing the counter; Fig. 10, a detail showing the spool-detent locked, and Fig. 11 a similar view showing the detent released.

Similar letters of reference in the several figures indicate similar parts.

The casing of the holder is composed of a front A, having an exposing-aperture, a rectangular casing or box B, and a back C, secured to the front by spring-clips $a\,a$, as ordinarily. The front is provided with the usual slide A', and in the casing B are journaled the film-containing roller or spool D and the winding or take-up roller E, the latter being provided with the usual winding or operating key or handle F.

Just in rear of the exposing-aperture in the front is the table or film-support G, and at the ends are provided rollers H H', over which the film passes from the spool to the take-up, the roller H constituting the measuring-roll and containing a film-marking device, such, for instance, as shown in the patent issued to the Eastman Dry Plate and Film Company, dated June 18, 1889, No. 405,454. As in the patent referred to, the measuring-roller is provided at one end with a small pinion 1 and with a plate 2, having an aperture, through which projects one end of a spring-arm 3, connected to a prick point or pin 4, passing through the roller and projecting at the opposite side. This arm is normally retracted, holding the prick-pin 4 below the surface of the roller, and at the opposite end of the roller is provided a stationary prick pin or point 5 operating to prick the film at each revolution of the roller, while the pin 4 is only projected to indicate the end of an exposure of film, at which point the film is to be severed, the perforations made by the pin 5 serving as a guide and insuring the severing of the film straight across.

Pivoted on a screw or stud 7 in casing B is a large wheel 8, having on its inner side gear-teeth 9, adapted to mesh with those of pinion 1, and a pin 10, eccentric to the center, arranged to engage an arm 11 pivoted on the casing, and at the proper time move it toward the measuring-roller, causing it to operate on the end of arm 3 and press prick-point 4 outward through the film passing over it. The measuring-roller, pinion, and gear-wheel are so proportioned relative to each other and the length of film constituting a single exposure or the length of the exposing-aperture in the front that the wheel 8 will be rotated once for each exposure, causing arm 11 to be raised by the pin 10 and the point 4 to be projected through the film, marking the ends of an exposure.

The disk 15, to which the end of the supply-spool is connected, as described in the patents of Eastman and Walker, dated May 5, 1889, or in any other suitable manner, is provided on its periphery with a series of teeth 16 adapted to be engaged by an arm or detent 17, pivoted upon a pin 18 in the casing, the other end of said arm resting against the periphery of wheel 8.

Upon the periphery of wheel 8 is a cam or projection 19, adapted (when the wheel is in the position indicated in Fig. 5 with the film-marker projected) to engage the rear end of the detent 17 and turn it on its pivot, causing the forward end to engage the teeth 16 on the spool-disk and arrest its rotation, thereby stopping the feeding of the film. The pin 18, upon which the detent is pivoted, projects through a thimble 20 in the casing, as shown more fully in Fig. 8, and is normally pressed outward by a spring 21 engaging the thimble and a shoulder 22 on the pin, thereby normally keeping the detent close to the side of the casing and directly over the periphery of the wheel 8, so as to insure its operation by the cam and permit its inward motion by pressure on the head of the pin. The extreme outer end of the detent-arm is connected to one end of a pawl 23 by passing through a perforation therein, and said pawl is normally pressed in contact with a ratchet-wheel 24, journaled on a pin 25 in the end of the casing by a spring 26, which is fastened to a pivoted pawl 27, also engaging the teeth of the wheel, said spring also serving to press the rear portion of the detent or arm 17 upon the periphery of wheel 8. A small plate 28 is also secured to the end of pawl 23 and rests between the wheel and casing, thus preventing its displacement. On the outer end of pin 26, secured to the ratchet-wheel 24, is a pointer or hand 29, co-operating with a series of indications on a plate 30 on the casing, this device serving as a counter to indicate the number of exposures made, and, if desired, the number remaining on the spool and unexposed, as will be explained.

The winding-reel is provided with the usual ratchet-wheel $b$ and pawl $c$ for preventing backward rotation of said reel, and the end of the film is secured to it in any usual or preferred manner. The film mounted in a roll on the supply-spool passes from it to the measuring-roller H, across the support, over roller H', and to the winding-reel.

Assuming the parts in position as shown in Fig. 4, in which a small amount of film has been wound forward after being marked, the operator rotates the winding-reel by means of the key, the film causing the rotation of the measuring-roller in the direction of the arrow, Fig. 4, and through its pinion the rotation of the wheel 8. When the said wheel reaches the position in Fig. 5, the pin 10 moves arm 11, thereby projecting the marking-pin 4, as described, and simultaneously the cam 19 turns the detent 17 on its pivot, causing its end to engage and arrest the spool, preventing farther movement of the film (and allowing the operator to stretch the film tightly over the support, thus dispensing with a tension device for the film, if desired,) the pawl $c$ preventing backward movement and holding it flat. After the exposure is made and it is desirable to wind a new supply of film, the operator presses upon the end of pin 18, moving the detent 17 bodily inward and disengaging its end from the wheel on the spool and carrying its rear end out of the path of the cam 19. When this position is reached, the spring 26 presses the rear end of the detent down inside the cam, as in Fig. 11, and when pressure on the pin 18 is released its spring 21 presses the detent toward the casing again and holds it against the side of the cam, so that when the latter is moved out of the way by the farther movement of the measuring-roller the spring will bring the detent into the path of the cam again. When the detent 17 is moved inward to release it from the spool, the pawl 23 is moved to the position in dotted lines, Fig. 8, turning the counter-disk one tooth, and thereby moving the hand over the dial, thus indicating one exposure, and so on, every time the spool is released the counter being moved one space.

Instead of employing precisely the same spool-arresting devices shown, any other—such, for instance, as that shown in the pending application of Eastman and Yawman, Serial No. 307,639—could be employed.

The proportion in the sizes of the measuring-roller and the connecting-gearing between it and the spool-arresting devices could be varied to suit different sizes of holders and the measuring-roller be permitted to make one or several revolutions, as may be desired. If the roller is to make but a single revolution, the cam operating the spool-arresting pawl would be mounted directly upon it, as will be understood by one skilled in the art.

Of course other devices could be employed for arresting the movement of the film after an exposure is reeled forward than those shown, the said devices being so connected to a counter—such as shown or otherwise—as to cause their simultaneous operation.

We claim as our invention—

1. In a roller-holder, the combination, with the film supporting and feeding devices, of a measuring-roller, a film-marker thereon, devices intermediate the roller and marker for actuating the latter, a film-arresting device, and connections between it and the measuring-roller, whereby the film will be simultaneously marked and arrested, substantially as described.

2. In a roller-holder, the combination, with the film supporting and feeding devices embodying a roller actuated by the movement of the film, of an arresting device therefor, a film-marker, a measuring-roller and connections between said roller and the arresting device and marker for causing their simultaneous operation, a counter, and connections between the counter and film-arresting device for causing the movement of the former when the latter is moved in one direction, substantially as described.

3. In a roller-holder, the combination, with a film-containing spool, of a roller operated by the movement of the film, a detent operating to cause the arrest of the spool, a projection operated by the roller for actuating the detent, a movable support for the detent, and a counter connected thereto, whereby when the detent is operated to release the spool the counter will be actuated, substantially as described.

4. In a roller-holder, the combination, with a film-containing spool, of a roller actuated by the film, a wheel geared thereto, a detent for arresting the spool, a film-marker on the roller actuated at regular intervals by the wheel, and connections between the wheel and detent for operating the latter, substantially as described.

5. In a roller-holder, the combination, with the film-spool and the detent engaging therewith, of the pin on which the detent is pivoted, the wheel actuated by the movement of the film for operating the detent, the pawl connected to the detent, the ratchet-wheel, and the spring for holding the pawl in engagement with the ratchet and the detent in engagement with its operating-wheel, substantially as described.

6. In a roller-holder, the combination, with the film-containing spool, of the wheel actuated by the film, the detent operated thereby engaging the spool, the pin on which the detent is pivoted, the spring operating on the pin, the ratchet-disk, the pawl co-operating therewith connected to the detent, and the spring operating on the pawl, substantially as described.

7. In a roller-holder, the combination, with a film-containing spool, of a measuring-roller, a detent engaging the spool, a projection operated by the roller for actuating the detent, a movable support on which the detent is pivoted, and a spring for actuating said support in one direction, substantially as described.

8. In a roller-holder, the combination, with a film-containing spool, of a measuring-roller, a detent engaging the spool, a projection operated by the roller for actuating the detent, a movable support on which the detent is pivoted, a spring for actuating the support in one direction, and a counter operated by the movement of the detent-support, substantially as described.

9. The combination, with a film-containing spool, of a wheel actuated by the movement of the film having a cam or projection thereon, a detent actuated by the cam and engaging the spool, and a movable support upon which the detent is mounted, whereby the detent can be moved bodily out of engagement with the cam, substantially as described.

10. The combination, with a film-containing spool, of a wheel actuated by the movement of the film having a cam or projection thereon, a detent actuated by the cam and engaging the spool, a movable support upon which the detent is mounted, and a counter connected thereto, whereby the detent can be moved bodily out of engagement with the cam and the counter thereby actuated, substantially as described.

11. The combination, with the holder casing or frame and a film-containing spool therein, of a wheel actuated by the movement of the film having a cam or projection thereon, a detent actuated by the cam for arresting the spool and wheel, devices for moving the detent and wheel laterally relative to each other to disengage them, and a counter on the end of the casing actuated by the movement of the wheel and detent relative to each other, substantially as described.

12. In a roller-holder, the combination, with a film-containing spool, of a roller actuated by the film, a wheel geared thereto, a detent for arresting the spool, a film-marker on the roller actuated at regular intervals by the wheel, connections between the wheel and detent for actuating the latter, and a counter operated by the detent, substantially as described.

GEO. EASTMAN.
PHILIP H. YAWMAN.

Witnesses:
FRED T. CHURCH,
FRANK M. CRANCH.